(12) United States Patent
Alattar et al.

(10) Patent No.: US 6,763,124 B2
(45) Date of Patent: Jul. 13, 2004

(54) EMBEDDING DIGITAL WATERMARKS IN SPOT COLORS

(75) Inventors: Osama M. Alattar, Tigard, OR (US); Alastair M. Reed, Lake Oswego, OR (US); Trent J. Brundage, Tigard, OR (US)

(73) Assignee: Digimarc Corporation, Tualatin, OR (US)

( * ) Notice: Subject to any disclaimer, the term of this patent is extended or adjusted under 35 U.S.C. 154(b) by 107 days.

(21) Appl. No.: 10/074,677

(22) Filed: Feb. 11, 2002

(65) Prior Publication Data

US 2002/0126873 A1 Sep. 12, 2002

Related U.S. Application Data

(63) Continuation-in-part of application No. 09/553,084, filed on Apr. 19, 2000, now Pat. No. 6,590,996, and a continuation-in-part of application No. 09/963,344, filed on Sep. 25, 2001
(60) Provisional application No. 60/327,687, filed on Oct. 5, 2001.

(51) Int. Cl.[7] .............................................. G06K 9/00
(52) U.S. Cl. ...................................... 382/100; 382/162
(58) Field of Search ................................ 382/100, 162, 382/163, 166, 167, 232; 348/241, 744; 358/1.13, 1.16, 3.06, 3.28; 375/130; 380/252; 386/94; 713/176

(56) References Cited

U.S. PATENT DOCUMENTS

| | | | |
|---|---|---|---|
| 5,051,835 A | | 9/1991 | Bruehl et al. |
| 5,216,724 A | * | 6/1993 | Suzuki et al. ............... 382/135 |
| 5,315,416 A | * | 5/1994 | Taniuchi et al. ............ 358/537 |
| 5,321,470 A | * | 6/1994 | Hasuo et al. ............... 399/366 |
| 5,363,202 A | | 11/1994 | Udagawa et al. |
| 5,363,212 A | * | 11/1994 | Taniuchi et al. ............ 358/452 |
| 5,530,759 A | * | 6/1996 | Braudaway et al. .......... 380/54 |
| 5,652,626 A | | 7/1997 | Kawakami et al. |
| 5,659,726 A | | 8/1997 | Sandford, II et al. |
| 5,689,623 A | | 11/1997 | Pinnard |
| 5,721,788 A | | 2/1998 | Powell et al. |
| 5,819,289 A | | 10/1998 | Sanford, II et al. |
| 5,825,892 A | | 10/1998 | Braudaway et al. |
| 5,862,260 A | | 1/1999 | Rhoads |
| 5,875,249 A | | 2/1999 | Mintzer et al. |
| 5,919,730 A | | 7/1999 | Gasper et al. |
| 5,935,755 A | * | 8/1999 | Kazmaier et al. ........... 430/120 |
| 5,946,414 A | | 8/1999 | Cass et al. |
| 5,949,055 A | | 9/1999 | Fleet et al. |
| 5,974,548 A | | 10/1999 | Adams |
| 6,104,812 A | | 8/2000 | Koltai et al. |
| 6,122,403 A | | 9/2000 | Rhoads |
| 6,185,312 B1 | | 2/2001 | Nakamura et al. |
| 6,239,818 B1 | | 5/2001 | Yoda |
| 6,246,777 B1 | | 6/2001 | Agarwal et al. |
| 6,297,508 B1 | * | 10/2001 | Barmore et al. ......... 250/459.1 |
| 6,304,345 B1 | | 10/2001 | Patton et al. |
| 6,332,031 B1 | | 12/2001 | Rhoads et al. |
| 6,334,187 B1 | | 12/2001 | Kadono |
| 6,356,363 B1 | | 3/2002 | Cooper et al. |
| 6,385,329 B1 | | 5/2002 | Sharma et al. |
| 6,404,926 B1 | | 6/2002 | Miyahara et al. |
| 6,466,209 B1 | | 10/2002 | Bantum |
| 6,535,617 B1 | | 3/2003 | Hannigan et al. |
| 6,559,975 B1 | | 5/2003 | Tolmer et al. |
| 6,577,744 B1 | | 6/2003 | Braudaway et al. |
| 6,590,996 B1 | | 7/2003 | Reed et al. |
| 6,614,914 B1 | | 9/2003 | Rhoads et al. |
| 6,625,295 B1 | | 9/2003 | Wolfgang et al. |
| 6,636,615 B1 | | 10/2003 | Rhoads et al. |
| 2001/0030759 A1 | | 10/2001 | Hayashi et al. |
| 2001/0030761 A1 | | 10/2001 | Ideyama |
| 2001/0033674 A1 | | 10/2001 | Chen et al. |
| 2001/0037455 A1 | | 11/2001 | Lawandy et al. |
| 2001/0040980 A1 | | 11/2001 | Yamaguchi |
| 2001/0052076 A1 | | 12/2001 | Kadono |
| 2002/0009208 A1 | | 1/2002 | Alattar et al. |
| 2002/0012444 A1 | | 1/2002 | Nishikawa et al. |
| 2002/0021824 A1 | | 2/2002 | Reed et al. |
| 2002/0027612 A1 | | 3/2002 | Brill et al. |
| 2002/0031241 A1 | | 3/2002 | Kawaguchi et al. |
| 2002/0067844 A1 | | 6/2002 | Reed et al. |
| 2002/0076086 A1 | | 6/2002 | Yoshiura et al. |
| 2002/0101597 A1 | | 8/2002 | Hoover |
| 2002/0105679 A1 | | 8/2002 | Haynes |
| 2002/0118381 A1 | | 8/2002 | Shirai et al. |
| 2002/0120849 A1 | | 8/2002 | McKinley et al. |

(List continued on next page.)

FOREIGN PATENT DOCUMENTS

| | | |
|---|---|---|
| EP | 1137244 | 9/2001 |
| EP | 1209897 | 5/2002 |
| GB | 2360659 | 9/2001 |
| WO | WO0108405 | 2/2001 |
| WO | WO0219269 | 3/2002 |
| WO | WO0221846 | 3/2002 |
| WO | WO02087250 | 3/2002 |

OTHER PUBLICATIONS

Alattar, "'Smart Images' Using Digimarc's Watermarking Technology," IS&T/SPIE's 12th Int. Symposium on Electronic Imaging, San Jose, CA, Jan. 25, 2000, vol. 3971, No. 25, 10 pages.

(List continued on next page.)

Primary Examiner—Jayanti K. Patel
(74) Attorney, Agent, or Firm—Digimarc Corporation

(57) ABSTRACT

The present invention relates to digitally watermarking spot colors. Spot colors are represented as digital files including a set of intensity values. These intensity values correspond to the amount or percentage of spot color ink that should be applied to a pixel, a group of pixel or to an image area. A watermark signal component including luminance value adjustments is converted to intensity value adjustments. These intensity value adjustments are applied to the spot color digital file to facilitated digital watermark embedding. In another embodiment, an adjustment is made to the intensity values to compensate for noise introduced by a scanner, camera or color conversion.

15 Claims, 3 Drawing Sheets

U.S. PATENT DOCUMENTS

| | | |
|---|---|---|
| 2002/0126872 A1 | 9/2002 | Brunk et al. |
| 2002/0163671 A1 | 11/2002 | Takaragi |
| 2002/0164051 A1 | 11/2002 | Reed et al. |
| 2002/0164052 A1 | 11/2002 | Reed et al. |
| 2002/0168085 A1 | 11/2002 | Reed et al. |
| 2003/0058477 A1 | 3/2003 | Brunk et al. |
| 2003/0103645 A1 | 6/2003 | Levy et al. |
| 2003/0187798 A1 | 10/2003 | McKinley et al. |

OTHER PUBLICATIONS

Battiato et al., "Robust Watermarking for Images Based on Color Manipulation," IH/99 LNCS 1768, pp. 302–317, 2000.

Berghel et al., "Protecting Ownership Rights Through Digital Watermaking," Computer, pp. 101–103, Jul. 1996.

Bors et al.,"Image Watermarking Using DCT Domain Constraints," Image Processing, 1996, Proceedings, International Conference, vol. 3, 1996, pp. 231–234.

Dautzenberg, "Watermarking Images," Department of Microelectronics and Electrical Engineering, Trinity College Dublin, 47 pages, Oct. 1994.

Fleet et al., "Embedding Invisible Information in Color Images," Proc. Int. Conf. on Image Processing, vol. 1, pp. 532–535, Oct., 1997.

Reed et al, "Adaptive Color Watermarking," Proc. SPIE, vol. 4675, pp. 222–229, 8 pages, Jan. 21, 2002.

Tian, "Wavelet–Based Reversible Watermarking for Authentication," Proc. SPIE——Int. Soc. Opt. Eng., vol. 4675, 2002, pp. 679–690.

Vidal, "Non–Noticeable Information Embedding in Color Images: Marking and Detection," 1999 IEEE, pp. 293–297.

* cited by examiner

EMBEDDING DIGITAL WATERMARKS IN SPOT COLORS

RELATED APPLICATION DATA

This application is a continuation in part of U.S. patent application Ser. No. 09/553,084, filed Apr. 19, 2000 now U.S. Pat. No. 6,590,996. This application is also a continuation in part of U.S. patent application Ser. No. 09/963,344, filed Sep. 25, 2001. The present application also claims the benefit of U.S. Provisional Application No. 60/327,687, filed Oct. 5, 2001. The present application is also related to assignee's U.S. patent application Ser. No. 09/503,881, filed Feb. 14, 2000, which is a continuation in part of application Ser. No. 09/186,962, filed Nov. 5, 1998, which is a continuation of U.S. application Ser. No. 08/649,419, filed May 16, 1996, now U.S. Pat. No. 5,862,260. Each of the above-mentioned patent documents is herein incorporated by reference.

FIELD OF THE INVENTION

The present invention relates to digital watermarking systems and methods, and is particularly illustrated with reference to digitally watermarking spot colors.

BACKGROUND AND SUMMARY OF THE INVENTION

Digital watermarking technology, a form of steganography, encompasses a great variety of techniques by which plural bits of digital data are hidden in some other object, preferably without leaving human-apparent evidence of alteration.

Digital watermarking may be used to modify media content to embed a machine-readable code into the media content. The media may be modified such that the embedded code is imperceptible or nearly imperceptible to the user, yet may be detected through an automated detection process.

There are many processes by which media can be processed to encode a digital watermark. Some techniques employ very subtle printing, e.g., of fine lines or dots, which has the effect slightly tinting the media (e.g., a white media can be given a lightish-green cast). To the human observer the tinting appears uniform. Computer analyses of scan data from the media, however, reveals slight localized changes, permitting a multi-bit watermark payload to be discerned. Such printing can be by ink jet, dry offset, wet offset, xerography, etc. Other techniques involve varying the luminance of pixel colors.

Digital watermarking systems typically have two primary components: an embedding component that embeds the watermark in the media content, and a reading component that detects and reads the embedded watermark. The embedding component embeds a watermark pattern by altering data samples of the media content. The reading component analyzes content to detect whether a watermark pattern is present. In applications where the watermark encodes information, the reading component extracts this information from the detected watermark. Previously mentioned U.S. patent application Ser. No. 09/503,881, filed Feb. 14, 2000, discloses various encoding and decoding techniques. U.S. Pat. Nos. 5,862,260 and 6,122,403 disclose still others. Each of these patents is herein incorporated by reference. The reader is presumed familiar with the many other digital watermarking techniques.

Sometimes an image is printed using "spot color" inks instead of process inks (e.g., cyan, magenta, yellow and black, hereafter "CMYK"). Spot colors can be produced in a vibrant range of colors, and can have characteristics that are not generally available in process inks, such as day-glow or metallic ink among others. There are thousands of spot colors. Yet, the color gamut (or range) of CMYK is limited. This means that most spot colors, when converted to a CMYK approximation, will not match the original spot color. This presents a problem when attempting to embed a digital watermark within the spot color. One digital watermarking approach produces an approximation of the spot color image using only CMY or CMYK inks. A digital watermark signal is embedded through modulating (or changing) various CMYK pixels. Since the original spot color may lie outside the CMYK gamut, this first spot color watermarking approach can yield poor results.

The present invention provides various methods to effectively embed a digital watermark signal within a spot color. While our inventive processes can be applied to a variety of spot color printing techniques, our processes are particularly helpful for embedding spot color digital files (e.g., electronic representations of the spot color or digital spot color profiles, etc.). A spot color digital file generally includes a set of intensity values indicating an amount or percentage of ink to be applied to a pixel or to a print area. A printing plate (or other printing map) is produced in accordance with the digital file. Spot color ink is applied to the printing plate to facilitate printing.

In a first aspect of the present invention, a digital watermark signal is converted from a set of luminance tweaks (e.g., signal modifications or a message, etc.) to a set of intensity tweaks. This watermark intensity set is provided to modulate (or alter) the spot color digital file.

According to a second aspect, noise introduced from an image capture device (e.g., a digital camera, scanner, etc.) is compensated for through intensity modulation of a digital watermark signal. In one implementation of this aspect, color saturation is calculated as a modulation factor to offset the noise.

According to a third aspect of the present invention, a spot color detection method authenticates a spot color. A light emission from a spot color is separated into its constituent spectrum components. A signature is determined based on the constituent spectrum components. This signature is used to identify counterfeits. For example, a CMYK approximation of the spot color will yield a different signature in comparison to the original spot color.

The foregoing and other features and advantages of the present invention will be even more apparent from the following detailed description, which proceeds with reference to the accompanying drawings.

BRIEF DESCRIPTION OF THE DRAWINGS

FIG. 2 is a flow diagram illustrating a noise-compensation process.

DETAILED DESCRIPTION

Embedding Spot Colors in a Digital Domain

Spot colors can be represented as digital files (e.g., an electronic representation of a spot color or a digital profile of the spot color). Most generally, such a digital file includes a set of intensity values. Intensity in this context preferably refers to the amount or percentage of spot color ink to be applied to a given area. An intensity value corresponds to a pixel or to a group of image (or area) pixels. The intensity values are preferably represented in terms of percentages, levels or gray-scale values. A printing plate (or other printing map) is produced in accordance with these intensity values. In a digital domain, intensity values are spot color generic, e.g., a 100% intensity value can represent both a 100% yellow spot color and a 100% black spot color, since intensity refers to the amount or percentage of ink and not necessarily to the type or color of spot color ink. Differentiating between the yellow and black spot colors is handled in the printing process. For example, a press operator ("pressman") applies the appropriate spot color ink to a print plate to produce the intended spot color print. Or the appropriate spot color ink is selected through a computerized user interface, which is then automatically added to the printing process.

Some types of digital watermark embedding are accomplished by applying tweaks (or signal modifications) to luminance values of the pixels in an image. In the case of Cyan (C), Magenta (M), Yellow (Y) and Black (B) process images, the luminance tweak can be applied to respective C, M, Y and K channels, e.g., using a weighting function for the various color channels.

Figure 1A:
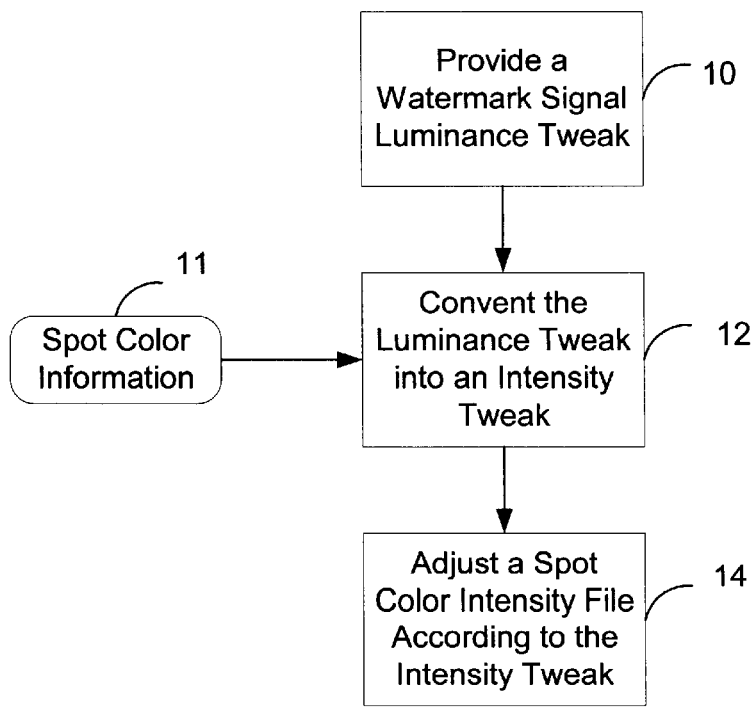
FIGS. 1 and 2 are flow diagrams illustrating various aspects of our inventive spot color embedding techniques.

In the case of spot color digital files, however, the only available data in the digital file is the intensity values corresponding to pixels or group of pixels, with no reference to their luminance values. With reference to FIG. 1a, we have found that digitally watermarking a spot color digital file can be improved by converting or mapping a luminance watermark signal component (e.g., a signal tweak) into a corresponding intensity tweak for a specific spot color ink (step 12). Knowledge of the spot color can be provided (step 11) to the conversion step 12. For example, the type (e.g., which spot color) or characteristics (e.g., luminance range, intensity and/or color characteristics, etc.) of the spot color can be provided. The intensity tweak is then applied to the digital file (step 14). Even further details of the FIG. 1a process are flushed out below.

We note that the higher the luminance value of a spot color the smaller the range of luminosity it covers over an intensity range of 0 to 100% (or 0–255 gray-level intensity). Consider the following example. 100% intensity white (e.g., no spot color ink) has the highest luminance value (e.g., a 255 gray-level luminance value). And 100% intensity black (e.g., a 255 gray-level intensity) has the lowest luminance value (e.g., 0 gray-level luminance). So the luminosity range between 100% intensity white and 100% intensity black is 0–255 gray-level. This implies that a change of 1 gray-level to the intensity value of a pixel in a digital file (corresponding to black Spot ink) will yield a 1 gray-level change in the luminance value of the pixel. This one-to-one relationship does not hold true for all spot colors. Indeed, yellow spot color ink at 100% intensity (e.g., 255 gray-level intensity) has a luminance of about a 200 gray-level. This implies that the yellow spot color ink has a luminance range of about 200–255 gray-levels. Hence, knowledge (step 11) of which spot color is being converted (step 12) is valuable to help ensure an accurate conversion process.

In one embodiment, a mapping (or lookup table) of luminance to intensity is determined. A watermark embedder uses this mapping to facilitate the watermarking of a digital spot color file, particular in a case where a watermark tweak is presented as a luminance value adjustment, but a spot color is represented in terms of intensity values. This mapping is generally spot color specific, e.g., for a given spot color having an X gray-level luminance tweak, the X gray level tweak is mapped to a Y gray-level intensity tweak (where X and Y are integers).

Figure 1B:
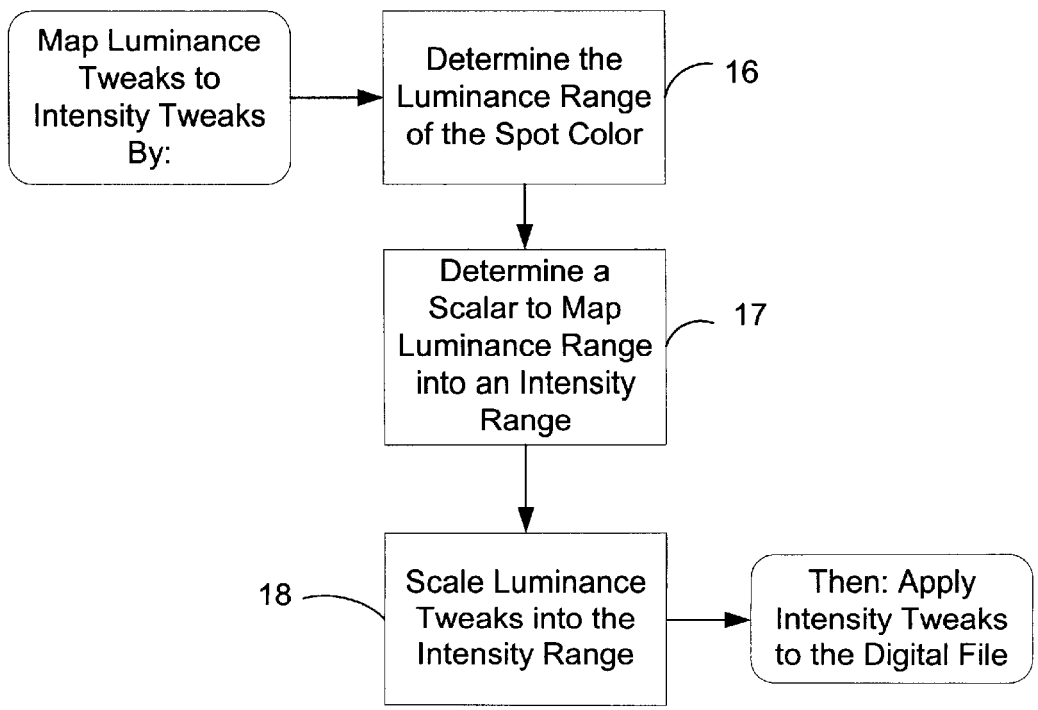

In one implementation, and with reference to FIG. 1b, we map a luminance change into an intensity change by first determining the luminosity range of a specific spot color (step 16). A scalar is determined to scale a luminance value to fit within an intensity range (step 17). The scaling factor is then used to scale luminance tweaks into intensity tweaks (step 18). The intensity tweaks are applied to the corresponding pixel intensity values in the digital file. For example, consider a yellow spot color that has a limited luminance range of about 55 gray-levels. The yellow spot color is scaled into a full luminance range (e.g., 0–255 gray-level) by a scalar of about 4.64. Then, to convert a watermark luminance tweak into an intensity value, the 4.64 scale factor is used to scale a luminance tweak (e.g., a 3 gray-level tweak) into a corresponding gray-level intensity tweak (i.e., 3×4.64≈14). The intensity tweak is applied to the pixel's intensity value in the digital file. In another implementation, we group colors into color groups based on colors characteristics (e.g., wavelength, hue, visual similarities) and map color within a group with the same scale factor. This method reduces the size of the look up table and speeds the processing of colors. Our approaches confirm the value of knowing the spot color, and its luminance range, instead of blindly embedding a given spot color.

Of course, the specific numbers used in the above example (including the 0–255 gray-scale) are not intended to limit the scope of our inventive methods. Also, as an alternative implementation, instead of mapping a luminance range into a full intensity range, the luminance range can be mapped to a subset of the full intensity range. It should also be appreciated that the look up tables or algorithms can be generated to map a luminance tweak into an intensity tweak for many (if not all spot colors). Once this table or algorithm is generated, it can be repeatedly used to handle the spot color embedding for a particular spot color.

Offsetting Capture Device Effects

Image capture devices (e.g., digital cameras, scanners, etc.) have different levels of sensitivity for different spot color inks. Image capture devices are typically designed to capture data in a red (R), green (G) and blue (B) color format. And they generally use light sensitive elements, like CCDs, to record the amount of RGB components in light reflected from an image or object. Due to limited space on a capture device's sensing surface, the number and/or pattern of sensing elements for each of the three colors is typically optimized. There are different surface distribution patterns to optimize the sensing elements, e.g., the "Bayer pattern." In the Bayer pattern, the number of the green sensing elements is about double the number of each of the blue and red sensing elements. In addition, since there is a limited number of blue sensing elements it is common for the image capture device to compress the blue channel's data, which introduces noise into the blue channel. Since 100% intensity yellow is essentially the absence of blue in the RGB color format, some noise in the blue channel corresponds to variations in the intensity of yellow, which can directly degrade a digital watermark signal.

When embedding a digital watermark within an image including C, M, Y and K channels, luminance tweaks can be applied to each of the four-color channels using different weighting functions. The weighting function may modulate the tweak values for each of the four channels, e.g., based on the channel's ability to hide the watermark, or according to the sensitivity of the image capture device to each of the channels. In the case of spot colors, however, a digital file generally has only one channel, e.g., containing the intensity values of the pixels. We modulate (or adjust) an intensity tweak of a digital watermark signal with a signal-noise adjustment factor, for individual spot colors based on a prior knowledge of a respective spot color's characteristics, so as to offset the noise introduced by an image capture device.

In one implementation, to offset an image capture device's (camera, scanner, etc.) effect, we calculate a "Yellow Saturation" factor as the signal-noise adjustment factor. A watermark signal's corresponding intensity tweaks can be adjusted with the Yellow Saturation factor.

Figure 2:
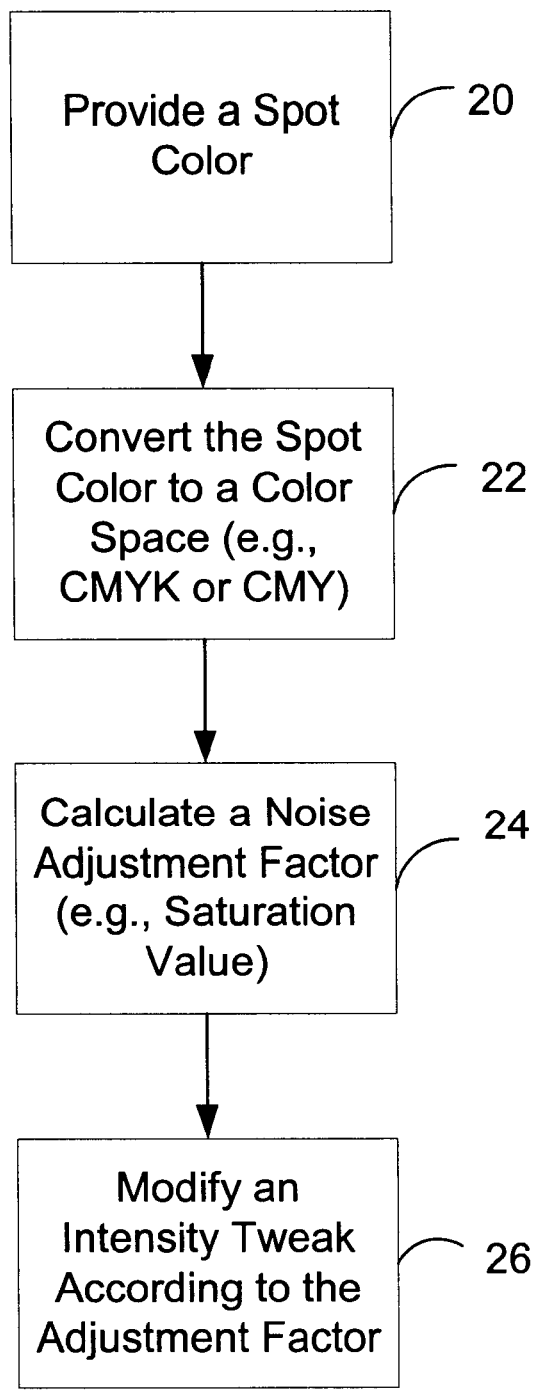

We have found that an image capture device's noise level is higher when a spot color has a high level of yellow component (or Yellow Saturation). We can compensate for this noise component by modulating the intensity tweak levels based on the level of Yellow Saturation in the spot color. With reference to FIG. 2, a CMYK representation of the spot color is provided to calculate a spot color's Yellow Saturation (steps 20 and 22). It should be appreciated that there are many known formula, tables and conversion techniques, including software programs, for converting a spot color into a CMYK or CMY approximation. A CMYK spot color approximation can be further reduced to a CMY equivalent. We preferably generate our Yellow Saturation factor from a CMY equivalent (step 24). In one implementation, Yellow Saturation is determined according to the following equation:

$$\text{Yellow Saturation} = ((3*Y - 2*C - M)/(2*(\text{Max}C + \text{Max}M + \text{Max}Y))) + 1,$$

where MaxC, MaxM and MaxY represent the maximum values of C, M and Y.

The above formula produces a Yellow Saturation factor between about 0.5 and 1.5. As a gauge, black's Yellow Saturation factor is 1.0. For colors with high yellow components, the Yellow Saturation factor is generally between 1.0 and 1.5. For colors with low yellow components the Yellow Saturation factor is between 0.5 and 1.0. The Yellow Saturation factor is then used to modulate (or adjust) a watermark's intensity tweaks before they are applied to the image intensity values (step 26). In one implementation, for example, the Yellow Saturation factor is used to scale the intensity tweaks. This allow us to normalize the signal robustness across all colors by lowering the signal's level at colors that are less sensitive to the capturing devices' noise, as well as by increasing the signal's level for colors that are more sensitive to the capturing devices' noise. The implementation of the Yellow Saturation factor helps to adjust the overall watermark signal level to offset the noise level introduced by an image capture device.

In the above implementation, a Yellow Saturation factor is calculated based on a CMY representation of the spot colors. In another implementation, RGB or L*a*b colors are used to calculate the spot color representation. Moreover, while the above discussion has focused on a yellow saturation value for correcting capture device noise, the present invention is not limited to such. Other color saturation factors can be calculated to modulate watermark intensities to compensate for noise, compression levels, and number of sensing elements, etc.

Spot Color Detection

Figure 3A:
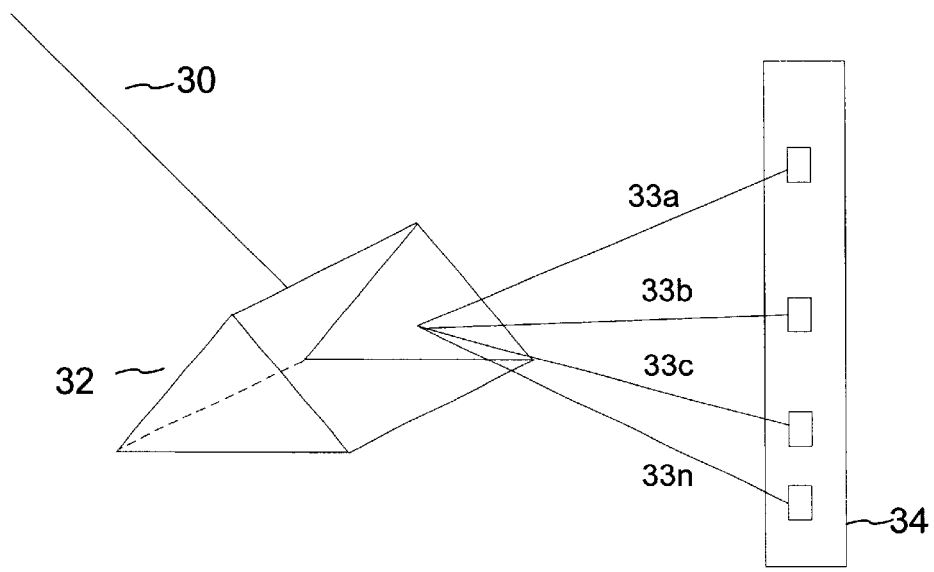
FIGS. 3a and 3b are diagrams illustrating aspects of a spot color detection process.
Figure 3B:
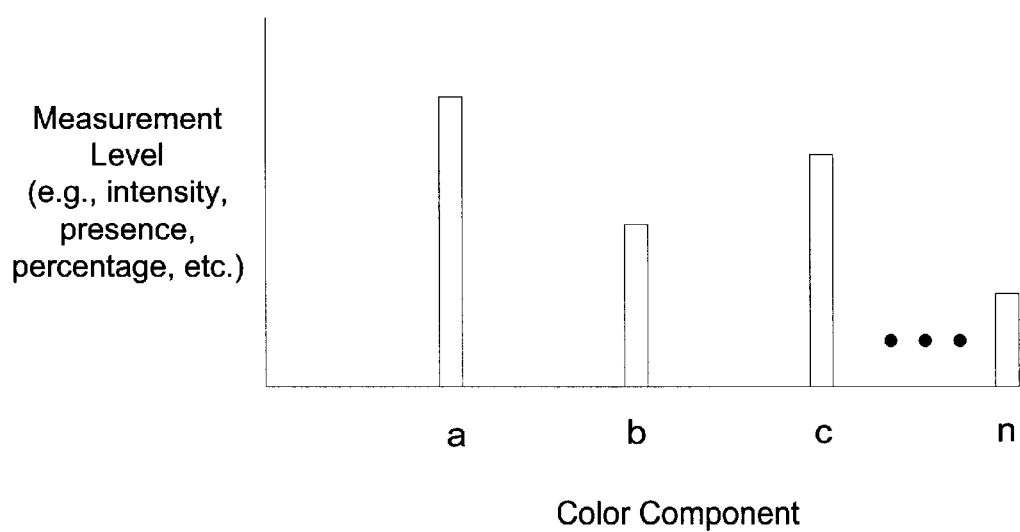

Another inventive aspect of the present invention is a spot color detection method. In one implementation, our spot color detection techniques verify authenticity of a spot color by analyzing component colors of the spot color. And the spot color need not be embedded with a digital watermark. With reference to FIGS. 3a and 3b, a spot color emission (e.g., light) 30 is passed through a prism 32. An optical assembly (not shown) is optionally provided to focus emission 30 to the prism 32. Prism 32 separates the spot color emission 30 into its color spectrum components 33a–n, where n is a maximum number of possible color components. Or a diffraction grating (or beam splitter) can be used, so long as they separate or otherwise account for the color components of spot color emission 30. In an alternative implementation, a spectrophotometer, such as those manufactured by Hewlett-Packard, Hitachi or Cary, can be used instead of prism 32, so long as it identifies the various spot color components or other unique attributes of a spot color. (It will be appreciated that spectrophotometry provides measurements and/or other analysis of emissions absorbed, scattered, or emitted (or other color analysis) of a spot color). A unique color signature can be generated from the results of such an analysis.).

A detector 34 such as a CCD array detects the component colors 33a–n. Of course, the detector 34 can be aligned or calibrated with prism 32 to help improve detection reliability. Or if a spectrophotometer is used, such detecting functionality is likely provided by the spectrophotometer, which can detect on absorption or emission characteristics, for example.

A "signature" is determined for a subject spot color based on the color components 33a–n. A signature in this implementation, e.g., as shown in FIG. 3b, represents the various spot color spectral components a–n. For example, the signature includes the intensity of the various spot color components. Or the signature includes the relative percentages or presence of the individual spot color components. In another implementation, the signature represents the spectrophotometer analysis of a spot color. Regardless of the implementation, a spot color signature provides a baseline or "expected" signature.

Once determined, an allegedly authentic spot color signature is compared against an expected signature. This comparison is used to determine authenticity. Consider a counterfeited document, in which the original document is printed with spot color ink. In many counterfeiting operations, a spot color is converted to a CMY, CMYK or RGB approximation of the spot color. Such an approximation will yield a different color spectral signature. A comparison of a counterfeit signature against the expected signature reveals the counterfeit. Accordingly, identification badges, identification papers, travel paper, pictures, logos, security papers, passports, product labels and packaging, visas, etc., can be printed with a spot color to render additional security.

Conclusion

The foregoing are just exemplary implementations of the present invention. It will be recognized that there are a great number of variations on these basic themes. The foregoing illustrates but a few applications of the detailed technology. There are many others.

The section headings in this application are provided merely for the reader's convenience, and provide no substantive limitations. Of course, the disclosure under one section heading may be readily combined with the disclosure under another section heading.

To provide a comprehensive disclosure without unduly lengthening this specification, each of the above-mentioned patents and patent applications is herein incorporated by reference, along with U.S. patent application Ser. No. 09/689,226, filed Oct. 11, 2000. The particular combinations of elements and features in the above-detailed embodiments are exemplary only; the interchanging and substitution of these teachings with other teachings in this application and the incorporated-by-reference patents/applications are expressly contemplated.

The above-described methods, inventive spot color watermarks and related functionality can be facilitated with computer executable software stored on computer readable media, such as electronic memory circuits, RAM, ROM, EPROM, flash memory, magnetic media, optical media, magnetic-optical media, memory sticks, hard disks, removable media, etc., etc. Such software may be stored and/or executed on a general-purpose computer, or on a server for distributed use. Data structures representing the various luminance values, modulated intensity values, methods, embedded images, spot color signals, data signals, intensity values, etc., may also be stored on such computer readable media. Also, instead of software, a hardware implementation or a software-hardware implementation can be used.

While we have described "intensity" as referring to the amount or percentage of spot color ink to be applied to a given area, the present invention is not so limited. Of course the intensity can represent other spot color attributes as well. Also, while our invention anticipates converting a luminance value watermark signal tweak into an intensity value, our invention is not limited to such. Indeed, in an alternative embodiment, a watermark signal is calculated in terms of intensity values, which are applied to spot color digital files directly.

In view of the wide variety of embodiments to which the principles and features discussed above can be applied, it should be apparent that the detailed embodiments are illustrative only and should not be taken as limiting the scope of the invention. Rather, we claim as our invention all such modifications as may come within the scope and spirit of the following claims and equivalents thereof.

What is claimed is:

1. A method comprising:
   providing a digital watermark component comprising luminance value adjustments;
   converting the luminance value adjustments to intensity value adjustment; and
   adjusting a spot color signal comprising a set of intensity values with the digital watermark component, the component comprising the intensity value adjustments.

2. The method of claim 1, further comprising providing spot color information to said converting step.

3. The method of claim 2, wherein said converting step comprises mapping the luminance value adjustments to the intensity value adjustments.

4. The method of claim 2, wherein said converting step comprises determining a luminance range of the spot color signal; mapping the determined luminance range into an intensity range, the mapping being accomplished with at least a scalar; and scaling the luminance value adjustments by the scalar to convert to the intensity value adjustments.

5. The method of claim 2, wherein said spot color information comprises at least one of luminance range and spot color identifier.

6. The method of claim 1, wherein intensity comprises an amount or percentage of spot color ink to be applied to a printing surface.

7. A method comprising:
   providing a spot color;
   determining a first multicolor approximation of the spot color;
   calculating an adjustment factor from the first multicolor approximation; and
   modifying a digital watermark signal according to the adjustment factor.

8. The method of claim 7, wherein the first multicolor approximation comprises at least one of a CMY approximation, CMYK approximation and RGB approximation.

9. The method of claim 7, further comprising embedding the modified digital watermark signal in the spot color, the spot color comprising a digital file including intensity values.

10. The method of claim 9, wherein the adjustment factor comprises a color saturation factor.

11. The method of claim 10, wherein the color saturation factor comprises a yellow saturation factor.

12. The method of claim 7, wherein the adjustment factor adjusts noise introduced by at least one of a digital camera and scanner.

13. The method of claim 7, wherein the adjustment factor adjusts noise introduced by at least one of compression and color conversion.

14. The method of claim 11, wherein the first multicolor approximation comprises a Cyan (C), Magenta (M) and Yellow (Y) approximation and the yellow saturation factor is determine according to:

$$((3*Y-2*C-M)/(2*(MaxC+MaxM+MaxY)))+1,$$

where MaxC, MaxM and MaxY respectively represents a maximum value of C, M and Y.

15. A method comprising:
   analyzing a spot color with a spectrophotometer;
   forming a spot color signature relating to the analysis; and
   providing the spot color signature to verify the authenticity of materials printed with the spot color.

* * * * *